2,795,597

PROCESS FOR AROMATIC ISOCYANATE MANUFACTURE

Walter D. Smutz, Wilmington, Del., assignor to E. I. du Pont de Nemours and Company, Wilmington, Del., a corporation of Delaware No Drawing. Application April 24, 1953,
Serial No. 351,024

7 Claims. (Cl. 260—453)

This invention relates to processes for the manufacture of aromatic isocyanates. More particularly, it relates to processes in which an aromatic primary monoamine is reacted with phosgene at a temperature below the decomposition temperature of the aromatic carbamyl chloride corresponding to the amine by feeding the amine into a liquid reacting mass while maintaining a phosgene reflux; and subsequently heating the reacting mass above the decomposition temperature of the carbamyl chloride while maintaining phosgene reflux to form the isocyanate. The processes are carried out in the presence of an inert organic liquid diluent.

The aromatic primary monoamine employed in the processes of the invention can be varied widely. The aromatic structure can, for example, be phenyl and can be substituted or unsubstituted. The nature of the ring substituents is largely immaterial altho, of course, the substituents are preferably those that are substantially inert in the process.

Preferably the aromatic primary amine is a phenyl primary monoamine by which I mean aniline or ring substituted aniline.

Illustrative of the aromatic primary monoamines used in the processes of the invention are aniline, parachloroaniline, 3,4-dichloroaniline, m-chloroaniline, p-methylaniline, 3-chloro-4-methylaniline, 3,5-dichloro-4-methylaniline, p-bromoaniline, 3-chloro-4-isopropylaniline, 3-chloro-4-ethylaniline.

The inert organic liquid employed in the processes of the invention can be varied widely but for practical purposes, it is one which boils above about 75° C. and it is preferably a solvent for the amine and phosgene reactants. Suitable materials are, for example, the aromatic hydrocarbons such as benzene, toluene, xylene, tetrahydronaphthalene, chlorinated aromatic hydrocarbons such as mono-chlorobenzene, ortho-dichlorobenzene, and other substituted aromatic hydrocarbons such as anisole and nitrobenzene. 1,4-dioxane is also suitable.

The processes of the invention are conveniently carried out by first charging into a reaction vessel an inert organic liquid diluent and phosgene to provide a liquid reaction medium. While refluxing the phosgene in the reaction vessel, the aromatic primary monoamine is fed into the liquid reacting mass.

While continuing to introduce the amine reactant into the liquid reacting mass, the temperature of that mass is increased as required to maintain a reflux of phosgene. Thruout the amine addition, however, the temperature is maintained below that temperature at which the carbamyl chloride corresponding to the aromatic amine would decompose to the corresponding isocyanate with liberation of hydrogen chloride.

The temperature of the reacting mass at the start of the process will vary with the inert organic liquid diluent used and the relative proportion of phosgene and inert organic liquid diluent. For practical purposes, it will be found convenient to proportion these materials so as to have a reacting mass from which at a temperature of about 20° C. to 45° C. phosgene will boil. Lower temperatures can be used but these require increased refrigeration.

As the amine reactant is added and phosgene is consumed in reaction, the temperature of the reacting mass is gradually increased or alternatively additional phosgene is introduced so as to maintain the phosgene reflux. A sufficient amount of unreacted phosgene is maintained in the liquid reacting mass thruout the period of amine addition to provide for the phosgene reflux without having the temperature of the reacting mass exceed the temperature at which the carbamyl chloride corresponding to the amine will decompose to form the isocyanate. Although this decomposition temperature will vary somewhat with the particular carbamyl chloride formed, it will ordinarily be within the range of about 50 to 70° C. Thus, in general, the process is carried out between a temperature of 20° C. and 70° C. during the amine addition reaction.

According to a preferred embodiment, the amine reactant is fed into the reacting mass as a solution in an inert organic solvent. Preferably, the solvent so used will be the same material used as the liquid organic diluent in the reacting mass.

Upon completion of the amine addition or as the completion of the amine addition is approached, the temperature of the reacting mass is increased to above the decomposition temperature of the carbamyl chloride corresponding to the amine. Decomposition of the carbamyl chloride is evidenced by greatly increased evolution of hydrogen chloride from the reacting mass. The decomposition will begin, as mentioned heretofore, ordinarily at a temperature in the range of about 50 to 70° C. The decomposition is speeded by gradually increasing the temperature of the reacting mass until evolution of hydrogen chloride ceases. Ordinarily most of the hydrogen chloride will have been evolved by the time the temperature of the reacting mass has been increased to about 80 to 90° C. The temperature of the reacting mass is then preferably increased to the boiling point of the organic diluent, but not in excess of about 150° C., to facilitate removal of the remaining traces of hydrogen chloride. Thruout the decomposition step, phosgene is refluxed.

It will be appreciated that thruout the reaction phase of the process, that is, thruout the stage in which the amine is being reacted with the phosgene at the temperature below the decomposition point of the carbamyl chloride and thruout the subsequent decomposition reaction, hydrogen chloride is liberated. The evolution of gaseous phosgene from the reacting mass serves to carry along or sweep from the mass the liberated hydrogen chloride. The mixed phosgene-HCl vapors thus leave the reaction zone and pass into a reflux condenser, the phosgene therein being condensed and returned to the reaction zone and the hydrogen chloride passing thru uncondensed.

Thus it will be seen that in the processes of the invention, the phosgene is employed in excess of the stoichiometric amount required to react with the amine reactant to form the isocyanate. In general, there will be used at least about 1.05 mols of phosgene per mol of the amine reactant altho much larger excesses up to say 5 mols of phosgene per mol of amine can be used, but these large excesses become less economical because of the necessity for phosgene recovery equipment.

Some advantage will be obtained with certain of the inert organic solvents if there is included in the liquid reacting mass a small amount of a tertiary amine such as dimethylaniline and others as disclosed in U. S. 2,362,648.

In order that the invention may be better understood, the following examples are given in addition to the ex-

Example 1

Xylene, 235 parts, and 110 parts of phosgene were added to a glass reactor equipped with a reflux condenser cooled to −70° C., an agitator and a feed line for adding liquid reactant below the surface of the liquid reacting mass.

The xylene-phosgene solution was heated to 34° C. to obtain liquid reflux from the condenser. There was then added a solution of 127.5 parts of p-chloroaniline in 235 parts of xylene at a constant rate over a 45-minute period. The temperature of the reacting mass was gradually increased as the p-chloroaniline solution was added to maintain a brisk liquid reflux but not to exceed 55° C.

Upon completing the addition of p-chloroaniline, the temperature of the reacting mass was increased at a rate of 1° C. per minute until all solids in the reacting mass had disappeared and a clear amber solution was obtained. The residual unreacted phosgene was then removed by distillation. There thus remained a solution of para-chlorophenyl isocyanate in xylene.

Example 2

Using equipment in Example 1, there was charged 235 parts xylene and 110 parts phosgene to the reactor. Two parts of tetramethylurea was added to the reactor to promote the reaction. The reaction mass was heated to initiate reflux and then a solution of 127.5 parts of p-chloroaniline in 235 parts of xylene was added at a uniform rate over a forty-five minute period. While the p-chloroaniline solution was being added, the reaction mass temperature was increased to maintain a brisk liquid reflux but not to exceed 60° C.

Upon completing the addition of p-chloroaniline, the temperature of the reacting mass was increased at a rate of 1° C. per minute until all solids in the reacting mass had disappeared and a clear solution was obtained. The p-chlorophenyl isocyanate was then recovered by fractional vacuum distillation. The p-chlorophenyl isocyanate, B. P. 115–117° C. at 45 mm. was obtained as a colorless liquid. The yield was 95% of theory.

Example 3

In this example, the amounts and conditions of Example 1 were repeated except that benzene was used as the inert organic liquid diluent in place of xylene. The yield of p-chlorophenyl isocyanate was 91% of theory.

Example 4

Using equipment described in Example 1, 265 parts of xylene and 83 parts of phosgene were charged to the reactor. Two parts of tetramethylurea was added to the reactor to promote the reaction. The reaction mass was heated to 31° C. to initiate reflux and there was then added at a uniform rate over a forty-five minute period a solution of 122 parts of 3,4-dichloroaniline in 270 parts xylene. The temperature of the reaction mass was allowed to increase during the dichloroaniline addition in order that a continuous reflux be realized, but there was removed sufficient heat of reaction so that all of the dichloroaniline was added before a temperature of 60° C. was reached.

Upon completing the addition of dichloroaniline, the reaction mass was heated to decompose the intermediate 3,4-dichlorophenyl carbamyl chloride to the isocyanate. As soon as the reaction mass was free of solids, the condenser temperature was increased to allow residual phosgene and hydrogen chloride to escape while refluxing xylene. There thus remained a solution of 3,4-dichlorophenyl isocyanate in xylene.

The 3,4-dichlorophenyl isocyanate was identified by reacting it with dimethylamine to convert it to 3-(3,4-dichlorophenyl)-1,1-dimethyl urea. This reaction was carried out by gradually adding 34 parts dimethylamine over a fifteen minute period to the solution of 3,4-dichlorophenyl isocyanate in xylene at about 80° C. There was obtained 176 parts of the substituted urea compound. Assuming the isocyanate-dimethylamine reaction to be 100% of theory, this corresponds to a yield of 93% of 3,4-dichlorophenyl isocyanate from 3,4-dichloroaniline.

Example 5

Using equipment described in Example 1, there was charged 235 parts of anisole and 110 parts of phosgene. The reaction mass was heated to 28° C. to initiate reflux and then a solution of 127.5 parts of p-chloroaniline in 235 parts of anisole was added at a constant rate over a forty-five minute period. During the addition of the p-chloroaniline solution, the reactor temperature was allowed to increase to maintain a continuous liquid reflux but not to exceed 60° C. prior to completion of the p-chloroaniline solution addition.

Upon completion of the addition of the p-chloroaniline solution, the temperature of the reactor was increased gradually until all solids disappeared, then the cooling on the condenser was reduced to allow dissolved phosgene and hydrogen chloride to escape. There thus remained a solution of p-chlorophenyl isocyanate in anisole.

I claim:

1. In a process for the preparation of an aromatic isocyanate, the steps comprising feeding a primary monoamine selected from the group consisting of aniline alkyl substituted anilines and halogen substituted anilines into a reaction zone containing a liquid reacting mass comprising an inert organic liquid diluent and phosgene in excess of the amount required to react with said monoamine to form the corresponding isocyanate; maintaining throughout the period of feeding said monoamine a phosgene reflux and a temperature of the liquid reacting mass below the decomposition temperature of the aromatic carbamyl chloride corresponding to the monoamine; and subsequently heating the reacting mass at a temperature above the decomposition temperature of said carbamyl chloride and not in excess of about 150° C. while maintaining a reflux of phosgene whereby said aromatic isocyanate forms.

2. The process in accordance with claim 1 wherein said inert organic diluent has a boiling point above about 75° C. and said reacting mass is agitated during the addition of said monoamine.

3. The process in accordance with claim 2 wherein said monoamine is p-chloroaniline.

4. The process in accordance with claim 2 wherein said monoamine is 3,4-dichloroaniline.

5. The process in accordance with claim 2 wherein said monoamine is aniline.

6. The process in accordance with claim 1 wherein said monoamine is a haloaniline.

7. The process in accordance with claim 1 wherein said monoamine is an alkyl aniline.

References Cited in the file of this patent

UNITED STATES PATENTS

| | | |
|---|---|---|
| 2,362,648 | Lichty et al. | Nov. 14, 1944 |
| 2,480,089 | Slocombe et al. | Aug. 23, 1949 |
| 2,625,561 | Werntz | Jan. 13, 1953 |
| 2,643,264 | Fauser | June 23, 1953 |
| 2,689,861 | Thompson | Sept. 21, 1954 |